United States Patent [19]

Klatt

[11] Patent Number: 4,669,068

[45] Date of Patent: May 26, 1987

[54] POWER TRANSMISSION APPARATUS FOR ENCLOSED FLUID SYSTEMS

[76] Inventor: Frederick Klatt, 36 Ripley Rd., Medford, Mass. 02155

[21] Appl. No.: 486,265

[22] Filed: Apr. 18, 1983

[51] Int. Cl.[4] .................. G01J 1/40

[52] U.S. Cl. .................. 367/83; 340/857

[58] Field of Search .................. 367/81, 83, 82; 310/323, 330; 340/853, 857; 73/151; 333/248; 175/40, 50; 181/196, 197, 293, 193, 279

[56] References Cited

U.S. PATENT DOCUMENTS

| | | | |
|---|---|---|---|
| 1,675,318 | 7/1928 | Abrahams | 181/193 |
| 4,215,426 | 7/1980 | Klatt | 367/83 |

*Primary Examiner*—Thomas H. Tarcza
*Assistant Examiner*—Ian J. Lobo
*Attorney, Agent, or Firm*—Wolf, Greenfield & Sacks

[57] ABSTRACT

In a fluid filled tube, a technique for absorbing or generating converted energy from a traveling sonic wave.

The disclosed embodiment employs an acoustic energy converter mechanism and sonic wave channels which are both placed in the walls of the tube. The acoustic energy converter mechanism has faces which are exposed to the sonic wave channels rather than the annulus of the tube. The sonic wave channels allow the mechanical acoustic energy converter mechanism to be reduced in length, yet still expose the faces of the acoustic energy converter mechanism to sonic waves which are 180 degrees out of phase. The acoustic energy mechanism of this invention preferrably uses springs which substitute for the fluid medium of the quarterwave transformer cavity. These springs are designed to simulate a fluid having a sonic impedance and propagation velocity which will make the acoustic energy converter mechanism more compact. Still another version of the invention uses a piezoelectric bender mechanism instead of the inner oscillating body, associated resonating spring, quarterwave cavities, and electromagnetic generating coil arrangement.

8 Claims, 7 Drawing Figures

POWER TRANSMISSION APPARATUS FOR ENCLOSED FLUID SYSTEMS

BACKGROUND AND SUMMARY OF THE INVENTION

The present invention relates in general to a power and communication (control) transmission system for use with an enclosed fluid apparatus such as mud filled drill string of an oil well or other fluid filled pipe arrangement. Although the primary use of the system of this invention is for powering downhill oil well drilling tools or instruments associated with the drill string, the system may also be used in association with any other type of enclosed fluid system. Most of the detailed description, will, however, be directed to the use of the system in the drilling for oil.

Reference is now made to my prior U.S. Pat. No. 4,215,426 which shows a telemetry and power transmission system for enclosed fluid systems, particularly for the petroleum drilling industry.

Because the mechanism for power propagation of the present invention is by means of sonic waves, the following analysis reveals the attenuations of the sonic waves in the drill string for various acoustic frequencies and drill string lengths. The following analysis will lead to certain improvements that can be brought about to improve the construction of the apparatus described in my prior U.S. Pat. No. 4,215,426.

Accordingly, it is an object of the present invention to provide an improved power transmission system for an enclosed fluid apparatus showing in particular improved constructions over my prior U.S. Pat. No. 4,215,426.

Chart 1 illustrates the approximate power an acoustic pressure wave can propagate in freshwater. The power of a sonic plane wave per unit of area of the surface of the plane wave is equal to the impedance of the fluid multiplied by the square of the pressure amplitude. The power propagated is independent of frequency.

CHART 1

| Pressure (psi) | Watts/sq. in. (RMS) |
|---|---|
| 100 | 343 |
| 75 | 193 |
| 50 | 86 |
| 25 | 21 |
| 10 | 3.4 |

If the attenuation of the sonic wave due to viscous damping is minimal, then the power propagation of the sonic wave is substantial for the purpose of the apparatus shown in U.S. Pat. No. 4,215,426.

The attenuation of the sonic pressure wave in the drill string results almost entirely for the viscous damping of the mud. Refer to B. J. Patton, "Development And Successful Testing of a Continuous-Wave, Logging-While-Drilling Telemetry System," JPT (October, 1977) pg. 1215–1221. Viscous losses are basically proportional to the inverse of the acoustic frequency squared. Refer to D. G. Tucker, and Gazey, B. K.: "Applied Underwater Acoustics," Pergamon Press Ltd., London, 1966. The theoretical half-depth (D) attentuation of mud with various mud kinematic viscosities and various acoustic frequencies is shown in FIG. 4. The complimentary equation for pressure amplitude loss over a drill string length is:

$$Ps = \frac{(Ps)i}{L/D}$$

L is the drill string length

D is half depth loss per 1000 ft.

(Ps)i is the pressure pulse source amplitude

Ps is the pressure pulse amplitude a depth

For various acoustic frequencies Chart 2 gives the power attenuations in decibels and pressure amplitude attenuation in magnitude. The chart uses worst case for mud kinematic viscosity and worst case for depth, 30,000 feet.

CHART 2

| Frequency (hz) | (Ps)i/(Ps) | 20 log ((Ps)i/(Ps)) |
|---|---|---|
| 24 | 8,388,608 | 138.4 db |
| 12 | 102 | 40 db |
| 10 | 24.2 | 27.6 db |
| 8 | 7.26 | 17.14 db |
| 6 | 3.24 | 10.2 db |

It is now apparent that a practical acoustic frequency for energy propagation without substantial loss, at a worst case situation of 30,000 fee of depth and high mud viscosity, is less than 12 hertz. This desire for low frequency acoustics opposes some physical length problems with respect to the acoustic energy converter in particular in my prior U.S. Pat. No. 4,215,426.

Chart 3 gives the lengths of the apparatus described in U.S. Pat. No. 4,215,426 for various low acoustic frequencies and a propagation velocity of 4300 ft/sec. The lengths on the chart are in feet, the normalized number of drill pipe sections (30 ft), and the normalized number of drill string sections (90 ft).

CHART 3

| freq. (hz) | Length (ft) | Drill pipe (30 ft.) | Drill string (90 ft.) |
|---|---|---|---|
| 24 | 89.58 | 3 | 1 |
| 12 | 179.16 | 6 | 2 |
| 10 | 215 | 8 | 3 |
| 8 | 268.75 | 9 | 3 |
| 6 | 358.33 | 12 | 4 |

The previous discussion concerning acoustic attenuation of sonic pressure waves as a function of frequency suggests that the apparatus disclosed in my U.S. Pat. No. 4,215,426 should operate below 12 hertz to minimize overwhelming acoustic attenuation under a worst case situation of 30,000 ft. and maximum mud viscosity. At these low acoustic frequencies the apparatus of my patent would have tremendous capabilities; namely, large power propagation to downhole tools via acoustics and high tool information propagation via electromagnetics as discussed in U.S. Pat. No. 4,215,426. Unfortunately, because the oscillating bodies described in the patent of the acoustic energy converter are distributed over its length and the length of the acoustic energy converter increases with decreasing frequency, the acoustic energy converter shown in the patent would be difficult to engineer and manufacture at these low frequencies. In this respect refer to Chart 3.

Accordingly, it is an object of the present invention to provide an improved power transmission system having improved engineering and manufacturing practicality in the construction of the acoustic energy converter and the acoustic energy generator.

Another object of the present invention is to provide an improved power transmission system for enclosed fluid apparatus having an improved acoustic energy converter or generator particularly adapted for very low acoustic frequencies, below 12 hertz.

To accomplish the foregoing and other objects of this invention there is provided either an acoustic energy converter or acoustic energy generator that is comprised of two channels (sonic wave tuning channels), one end of each channel being open to the drill string annulus and the other end of each channel being exposed to the opposite faces, respectively of the acoustic energy converter mechanism. Because the ends of the channels are open to the drill string annulus, the channels are filled with the same mud which is in the drill string annulus and therefore the acoustic characteristics of the channels to the sonic wave, particularly propagation velocity and wavelength, are similar to the drill string annulus. Energy is absorbed from the sonic wave traveling down the annulus of the drill string by these openings and sonic waves of the same frequency are created in each channel. The sonic waves in each channel propagate in opposite directions; essentially propagating toward the faces of the acoustic energy converter mechanism. By manipulating the channel lengths, one can design the overall length of the acoustic energy converter to be less than, equal to, or greater than one-half wavelength but still expose the faces of the acoustic energy converter mechanism to sonic pressure waves which are 180° out of phase. The channels may be formed by spiralling or rippling or both spiraling and rippling thereof in the walls of the drill pipe. Complete embodiments of the invention are described hereinafter.

BRIEF DESCRIPTION OF THE DRAWINGS

Numerous other objects, features and advantages of the invention should now become apparent upon a reading of the following detailed description taken in conjunction with the accompanying drawing, in which.

DETAILED DESCRIPTION

Figure 1:
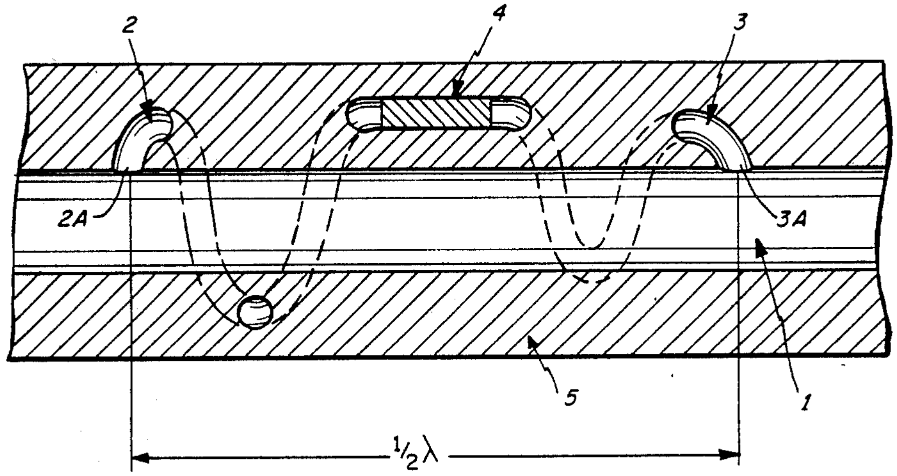
FIG. 1 is a schematic representation of one embodiment of the present invention.

FIG. 1 is a schematic representation of one apparatus used in connection with this invention. Reference is made herein to the acoustic energy converter construction but the same principles are also applied to the acoustic energy generator construction. Note the use of both the acoustic energy converter and the acoustic energy generator in my prior U.S. patent referred to herein. The apparatus for the acoustic energy converter illustrated in FIG. 1 comprises two quarter wavelength channels 2 and 3 whose openings 2A and 3A, respectively, to the drill string section annulus 1 are one-half wavelength apart. Note in FIG. 1 the one-half wavelength parameter. In FIG. 1 also note the acoustic energy converter mechanism 4 which may be the type shown in U.S. Pat. No. 4,215,426, such as shown, for example, in FIG. 6 of that patent.

In this discussion the quarterwave channels 2 and 3 should not be confused with quarterwave (transformer) cavities of the acoustic energy converter shown in U.S. Pat. No. 4,215,426. However, these quarterwave cavities are incorporated into the acoustic energy converter mechanism 4 shown in FIG. 1 herein.

It is also noted in FIG. 1 that both methods of channel integration are shown yet the actual design may only incorporate one method. The channel 2 is considered to be in a spiral form whereas the channel 3 may be considered as being in a rippled or folded form.

Since the ends of the quarterwave channels are open to the drill string annulus, the quarterwave channels are filled with the same mud which is in the drill string annulus and therefore, the acoustic characteristics of the channels to the sonic wave, particularly propagation velocity and wavelength, are similar to the drill string annulus. Energy is absorbed from the sonic wave traveling down the annulus of the drill string by these openings and sonic waves of the same frequency are created in each channel. These sonic waves in each channel propagate in opposite directions; essentially, propagating toward the faces of the AECM (acoustic energy converter mechanism). Because of the possibility of high mud viscosities, it is desired to use in these channels a low viscosity, non-compressible liquid with similar acoustic properties as the mud so as to minimize attenuation. In another embodiment the channels are smoothly opened to the annulus as prescribed by acoustic calculations to avoid acoustic reflections.

Figure 3:
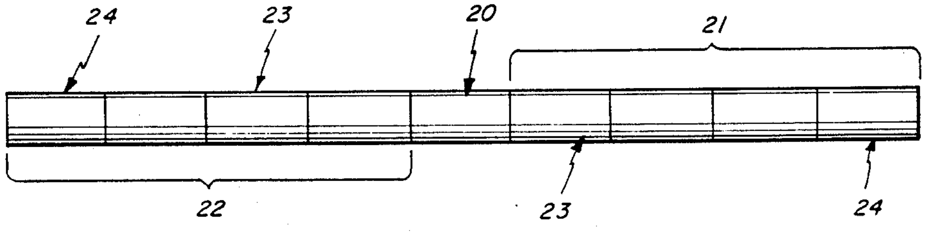
FIG. 3 shows still another embodiment of the present invention in a schematic form.
Figure 4:
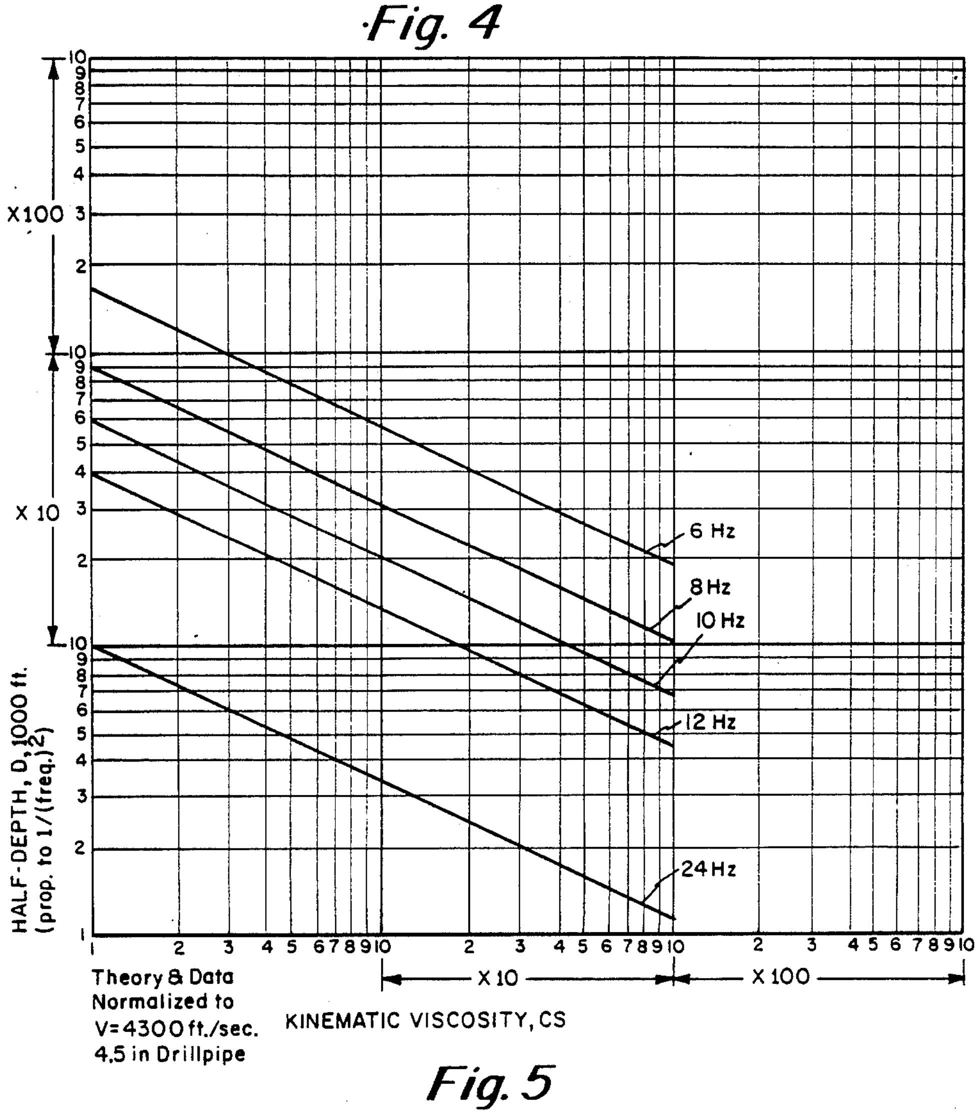
FIG. 4 is a graph of half depth attenuation verses kinematic viscosity for various acoustic frequencies.

If the difference in propagation distance between the paths of the sonic waves traveling to the two faces of the acoustic energy converter mechanism is an odd integer multiple of one-half wavelength, the sonic pressure and velocity at the two faces of the acoustic energy converter mechanism 4 is 180 degrees out of phase; a criteria of the acoustic energy converter in U.S. Pat. No. 4,215,426. If the designation for the channel and annulus lengths are as shown in FIG. 3, then:

$$L+L_2-L_1=N/2 \text{ wavelengths; N is an odd integer} \quad (1)$$

Figure 5:
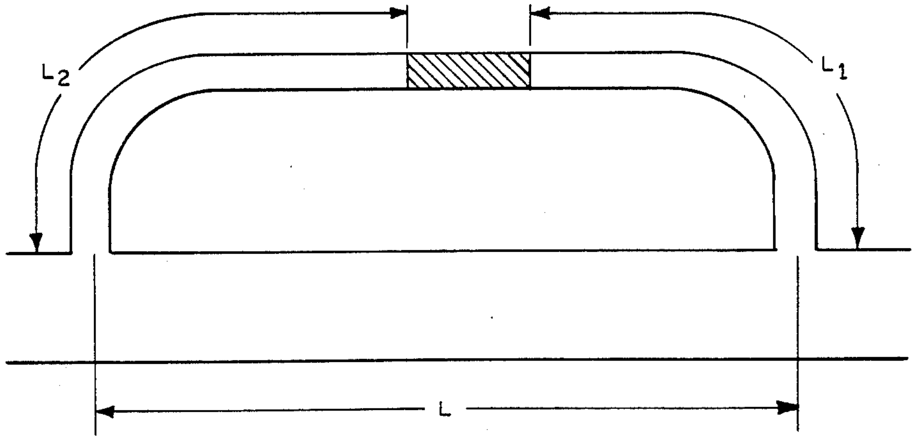
FIG. 5 is a further schematic diagram associated with the embodiment of FIG. 1.

With respect to FIGS. 1 and 5, the propagation distance of the sonic wave in one of the channels L1 is $\frac{1}{4}$ wavelength and the distance in the other channels is one-half wavelength. (annulus distance (L) plus $\frac{1}{4}$ wavelength (the L2 channel length) or $\frac{3}{4}$ wavelength; therefore, the difference in propagation distance is 1 times $\frac{1}{2}$ wavelength.

The total length of the two channels is equal to the length of the acoustic energy converter; namely, one-half wavelength. Since the acoustic energy converter mechanism 4 has a finite lenth, in order to integrate the two channels and the acoustic energy converter mechanism into the walls 5 of the half wavelength of drill string section, the two channels either spiral around the annulus 1 of the drill string in the axial direction or ripple or fold along the drill string in the axial direction. This rippling or spiraling of the quarterwave channels in the wall around the annulus of the drill pipe section absorbs the extra length added by the acoustic energy converter mechanism. These channels may be easily extruded, for instance, into the acoustic energy converter drill pipe sections during manufacturing.

One must realize that FIG. 1 is only a schematical representation and is not a scale drawing of the acoustic energy converter. For illustrative purposes, the schematical drawing shows both methods (spiral and ripple) of incorporating the "channels"; yet, the actual design will most likely incorporate only one of the methods. The schematical drawing also shows two single "channels" on each side of the AECM; yet in the actual design, each of the single channels on each side of the AECM shown in FIG. 1 could have multiple adjacent channels to increase the effective cross sectional area of the channel.

In FIGS. 1 and 5, if L1 is equal to 0, then the AECM face of this channel is exposed directly to the drill string annulus. Dimensions L2 and L are each $\frac{1}{4}$ wavelength to satisfy the equation (1). The total length of the acoustic energy converter is only $\frac{1}{4}$ wavelength long; a significant decrease ($\frac{1}{2}$ the size) in the acoustic energy converter length. In fact, depending on the slack which is absorbed by the spiraling or rippling of the channel, the dimension L may be reduced in length and the dimension L2 may be increased in length to satisfy the equation (1). Since the dimension L is the length of the acoustic energy converter, the energy converter may be further reduced in length.

By manipulating the channel lengths, one can design the overall length of the acoustic energy converter to be less then, equal to, or greter than $\frac{1}{2}$ wavelength but still expose the faces of the acoustic energy converter mechanism to sonic pressure waves which are 180 degrees out of phase. Similarly, the spiraling or rippling of the channels in the walls of the drill pipe absorb any channel slack. If convenient, a criteria which should be followed is to design the overall length of the acoustic energy converter to be the shortest length which will optimally absorb energy and minimize acoustic reflections.

The combined affects of the channels L1 and L2 and the annulus L is to form a resonating cavity because the sonic waves from the two openings in the annulus propagate in opposite directions. If the AECM is designed to meet the characteristic impedance of the resonating cavity, then the AECM absorbs all the energy in the resonating cavity. This energy is a portion of the energy propagating down the annulus which is diverted to the openings.

The acoustic energy converter mechanism 4 (AECM) of this invention such as shown in FIG. 1 is analogous to the acoustic energy convertor of U.S. Pat. No. 4,215,426; namely, the acoustic energy converter mechanism of this invention contains the resonating springs, the inner and outer oscillator bodies, etc., and the quarterwave "cavities" to increase displacement amplitudes. The exception of the acoustic energy converter mechanism of this invention to the acoustic energy converter of U.S. Pat. No. 4,215,426 is that there are no openings of the two faces of the acoustic energy converter mechanism to the drillpipe annulus in the patent. The two faces are now open to the two "channels". Because the "channels" of this invention allow the complicated acoustic energy converter mechanism to be incorporated into a smaller section of the lengthy acoustic energy converter, the acoustic energy converter mechanism (AECM) and more particularly, the acoustic energy converter of this invention can be more realistically engineered and manufactured than the acoustic energy converter of U.S. Pat. No. 4,215,426.

The medium of the quarterwave "cavities" of the acoustic energy converter of U.S. Pat. No. 4,215,426 has to be tuned to the characteristics of the overall acoustic system as discussed in U.S. Pat. 4,215,426. To make this medium more versatile, this invention uses springs to simulate the quarterwave medium. The springs can be designed to have a certain propagation velocity and impedance to a sonic wave. The equations for acoustic impedance and phase velocity of the springs are:

$$V = (K_L * L/p_o)^{\frac{1}{2}}$$

$$Z = (N/A)\,(K_L * L * p_o)^{\frac{1}{2}} = (N/A)\,(p_o * V)$$

V is propagation velocity of the longitudinal wave on the spring
Z is the sythesized fluid impedance
K is the total spring constant L
L is the total spring length
p is the average mass of the spring per unit length at spring equilibrium
A is the area effectively exposed to the mud which the compressional force of the spring acts upon. Essentially, it is the cross-sectional area of channels on one side of the acoustic energy converter mechanism or the frontal area of one side of the outer oscillating body of the acoustic energy converter mechanism exposed to the mud.
N is the total number of springs of each quarterwave cavity of the acoustic energy converter mechanism which act upon the area, A, and simulates the medium of the cavity.

It should also be noted that the quarterwave cavities on each side of the inner oscillating body, as shown in U.S. Pat. No. 4,215,426, are not necessary because the inner oscillating body is isolated from the high pressure of the mud and the quarterwave cavity medium is not a fluid but a spring. On one side of the inner oscillating body could be the quarterwave cavity. The other side of the inner oscillating body could be exposed to a cavity of sufficient length to allow total movement of the inner oscillating body. Because in this example there is only one quarterwave cavity side of the inner oscillating body, the overall length of the AECM will be further shortened. In all cases, it might be beneficial to vacuum all cavities in the inner oscillating areas because air, for instance, might have certain undesirable acoustic properties.

Figure 2:
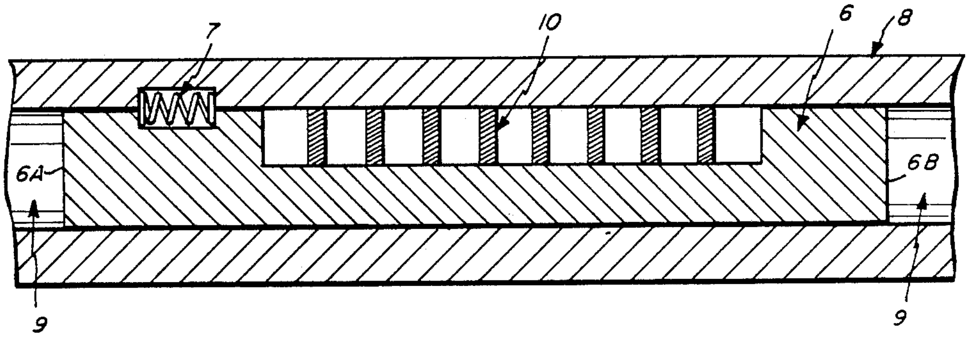
FIG. 2 shows another embodiment of the acoustic energy converter mechanism of this invention.

FIG. 2 shows another embodiment of the acoustic energy converter mechanism of this invention which can replace the AECM just discussed. There is no inner oscillating body, no quarterwave (transformer) cavity, no converter housing coil and no inner oscillatin body magnet. Instead, there is the outer oscillating body 6 and resonating spring 7 in the wall 8 of the drillpipe. The faces of the oscillating body are in the sonic channels 9. These are faces 6A and 6B. The generating means uses piezoceramic bender elements 10.

One end of the bender element attaches to the rigid drillpipe wall and the other end attaches to the oscillating body 6. Electricity is generated by the oscillatory movement of the outer oscillating body to the drillpipe wall bending these piezoceramic elements.

According to chart 3, at 8 hertz, the acoustic energy converter has to be nine drillpipe sections 23 long if the apparatus of FIG. 1 is used. FIG. 3 shows a possible acoustic energy converter embodiment of the invention which operates at 8 hertz. The acoustic energy converter mechanism 20 is in the center of the acoustic energy converter, and in this example, it is one drillpipe section long. All the oscillating mass, the resonating springs, and the quarterwave "cavities" of the acoustic energy converter mechanism are confined to this section. The quarterwave "channel" sections 21 and 22 make up most of the remaining drillpipe sections which are a majority of the total number of drillpipe sections; in this case, nine drillpipe sections. These drillpipe sections have none of the complexities of the acoustic energy converter mechanism section but are simply drillpipe sections with the discussed channels integrated into the walls around their annulus. As previously mentioned, these channels may be extruded into the walls of the drillpipe sections during drillpipe manufacturing. The end sections 24 are similar to the previously mentioned drillpipe sections except one end of the channels in their walls will open to the annulus of the drillpipe; therefore, allowing absorption of the acoustic wave propagating down the annulus of the drillstring.

If the depth of drilling is substantially less than the worst case situation, of 30,000 ft., the sonic attenuation is less and the operating frequency of the invention could be increased to a higher acoustic frequency. A higher frequency reduces the overall length of the acoustic energy converter. This reduction of length would imply a partial removal of the extruded channel drillpipe sections only. Apart from changing the quarterwave cavity springs (designed to support a certain acoustic frequency), no redesign of the AECM is necessary. It is obvious that this invention can be easily converted to accommodate different frequencies of operations.

Figures 6A, 6B:
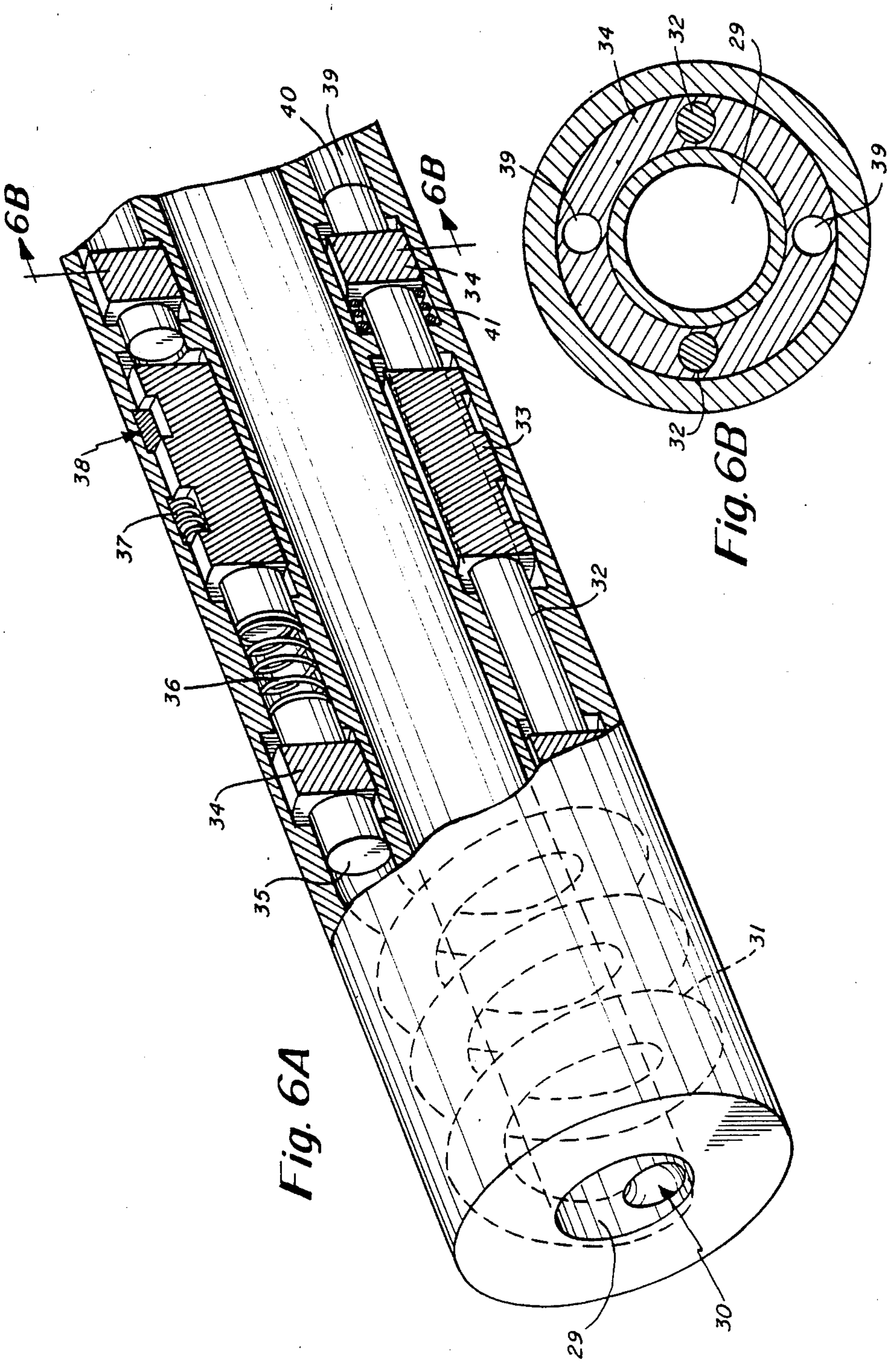
FIG. 6A and 6B show further details of the embodiment of the invention of FIG. 1.

FIG. 6A shows a cut-away pictoral representation of a portion of the acoustic energy converter mechanism. FIG. 6B is a cross-sectional view as taken along line 6B—6B of FIG. 6A.

The spiral channels 31 which are analogous to the channels illustrated in FIG. 1, have an opening 30 to the drill string annulus 29. These channels also open to the face 35 of the outer oscillating body 32, 34. Likewise, there is a spiral channel 39 similar to channel 31 which is exposed to the opposite face 40 of the outer oscillating body. The inner oscillating body 33, associated resonating spring 37 and electrical generator section 38 are acoustically connected to the outer oscillating body 32, 34 and associated resonating spring 41 by a spring 36 which is designed to have a particular impedance and propagation velocity to a sonic wave at the operating frequency. The spring 36 acts as a quarterwave transformer to the sonic wave. The rigid rod 32 of the outer oscillating body is not attached to the inner oscillating body but forms a bearing surface to the inner oscillating body. The rigid rod 32 prevents compression of the outer oscillating body due to the opposing pressure which the opposite faces of the outer oscillating body are exposed to by the channels. The structural member 34 attaches the faces 35, 40 and rigid rod 32 for structural rigidity.

The pictorial view shows two channels (one partially) on each side of the outer oscillating body. However, it is possible to have multiple adjacent channels beside either channel 31 or channel 39 to increase the effect of cross-sectional area exposed to the faces of the outer oscillating body. Again, the view shows only one quarterwave transformer spring 36. However, it is possible to have multiple adjacent springs. Also, the drawing shows only one rigid rod 32 but there are multiple rigid rods in the walls of the drill string. For instance, the cross-sectional view of FIG. 6B shows two faces and two rigid rods attached to the structural member 34. Therefore, there are four channels (one for each face on each end) and two quarterwave transformer wave springs.

The sonic waves traveling in the channels 31 and 39 cause the outer oscillating body to oscillate. The outer oscillating body induces a sonic wave of the same frequency in the spring 36. The spring 36 is designed to act as a quarterwave transformer to the sonic wave and transforms the impedance seen by the outer oscillating body to a different impedance seen by the inner oscillating body. The impedance seen by the inner oscillating body is designed to increase the oscillatory displacement of the inner oscillating body for practical electrical generation by conventional magnetic induction.

Having now described a limited number of embodiments of the present invention, it should be apparent to those skilled in the art that numerous other embodiments are contemplated as falling within the scope of this invention.

What is claimed is:

1. In an acoustical power and communication transmission system for use with a fluid-filled conduit means having a fluid-filled drill string annulus in a conduit wall through which the mud flows and an outer peripheral surface, said system comprising:

an acoustic energy conversion means having opposite first and second faces;

said conduit wall having an internal passage disposed inside of said conduit wall between said drill string annulus and outer peripheral surface, said internal passage receiving said acoustic energy conversion means, first and second channel means running inside of said conduit wall in opposite respective directions from said internal passage so that said internal passage is disposed therebetween, said first channel means in said conduit wall coupling from the drill string annulus to said first face;

and said second channel means in said conduit wall coupling from the drill string annulus to said second face, said first and second channel means having respective ports open to said drill string annulus so as to receive mud into both said channel means from said drill string annulus so as to be in fluid communication with the mud flowing in the drill string annulus, said ports spaced a predetermined distance along said drill string annulus, the conbined length of said channel means being greater than said predetermined distance, and said channel means being in at least one of spiral, ripple, or folded form.

2. In a power transmission system as set forth in claim 1 wherein both channel means have their ports directly connected to the drill string annulus so that mud flow occurs unimpeded to both channel means.

3. In a power transmission system as set forth in claim 1 wherein said first and second ports are separated by a distance of one-half wavelength of the operating frequency.

4. In a power transmission system as set forth in claim 3 wherein the lengths of the two channels differ by an odd integer multiple of one-half wavelength.

5. In a power transmission system as set forth in claim 1 wherein the channel and annulus lengths are given by:

$$L+L_2-L_1=N/2 \text{ wavelength}$$

where

N is an odd interer

L=annulus length $L_1$, $L_2$=Channel lengths.

6. In a power transmission system as set forth in claim 1 wherein the lengths of the two channels differ by an odd integer multiple of one-half wavelength.

7. In a power transmission system as set forth in claim 6 wherein the energy conversion means comprises means in the walls of the conduit means including an inner oscillating body, associated resonating spring, and associated electrical generating means acoustically coupled to an outer oscillating body and associated resonating spring by means of a third spring or set of springs which are designed to optimally simulate the acoustic characteristics of fluid medium of the acoustic quarter-wave transformer.

8. In a power transmission system as set forth in claim 1 wherein the energy conversion means is in the walls of the conduit means and comprises an outer oscillating body defining a cavity for housing and stimulating piezoelectric bender elements for generating electricity.

* * * * *